United States Patent Office 2,915,557
Patented Dec. 1, 1959

2,915,557

PROCESS FOR RECOVERING DI-ISOPROPYLBENZENE-DI-HYDROPEROXIDE FROM DI-ISOPROPYLBENZENE OXIDATION PRODUCTS

Robert W. F. Kreps, Willem F. De Wit, and Gerrit Schuur, all of Amsterdam, Netherlands, assignors to Shell Development Company, New York, N.Y., a corporation of Delaware No Drawing. Application June 3, 1957
Serial No. 663,000

Claims priority, application Netherlands June 5, 1956

9 Claims. (Cl. 260—610)

This invention relates to the recovery of di-isopropylbenzene-di-hydroperoxide from di-isopropylbenzene oxidation products. The invention relates more particularly to the provision of an improved process enabling the more efficient separation of meta-di-isopropylbenzene-di-hydroperoxide from mixtures containing the meta-di-isopropylbenzene-di-hydroperoxide in admixture with unconverted di-isopropylbenzene and di-isopropylbenzene-mono-hydroperoxide.

Di-isopropylbenzene-di-hydroperoxide is obtained by the direct oxidation of di-isopropylbenzene with molecular oxygen. Di-isopropylbenzene-dihydroperoxide may be obtained, for example, by the direct oxidation of the corresponding hydrocarbon, in the liquid phase, with oxygen, or an oxygen-containing gas such as air, at a temperature in the range of from about 80° to about 140° C. Catalysts and/or promoters may suitably be employed.

Oxidation products obtained will contain di-isopropylbenzene-di-hydroperoxide in admixture with unconverted di-isopropylbenzene and partial oxidation products thereof comprising di-isopropylbenzene-mono-hydroperoxide. When oxidizing a charge consisting essentially of meta-di-isopropylbenzene the resulting reaction mixture will comprise meta-di-isopropylbenzene in admixture with meta-di-isopropylbenzene-mono-hydroperoxide. When the charge to the oxidation contains mixtures of ortho-, meta- and para-di-isopropylbenzene the oxidation products contained in the resulting reaction mixture will generally consist predominantly of oxidation products of the meta- and para-isomers in the hydrocarbon charge. Separation of the para-di-isopropylbenzene-hydroperoxide leaves a reaction mixture containing the desired meta-di-isopropylbenzene-di-hydroperoxide. Since the para-di-isopropylbenzene-di-hydroperoxide is generally relatively insoluble in the total reaction mixture it is readily separated therefrom. Thus the para-di-isopropylbenzene-di-hydroperoxide may be separated from the total reaction mixture by means comprising one or more such steps as, for example, filtration, centrifuging, decantation, cooling, etc.

It is to the separation of meta-di-isopropylbenzene-di-hydroperoxide from mixtures so obtained containing it in admixture with unconverted di-isopropylbenzene and with partial oxidation products comprising di-isopropylbenzene-mono-hydroperoxide that the present invention is directed. The invention is applied with advantage to the resolution of mixtures comprising meta-di-isopropylbenzene-di-hydroperoxide in admixture with di-isopropylbenzene and di-isopropylbenzene-mono-hydroperoxide, regardless of the source or method of production of the mixture. Recovery of the desired meta-di-isopropylbenzene-di-hydroperoxide in a high state of purity from such mixtures has, heretofore, often presented difficulties. The complexity and cost of operation to obtain a product of satisfactory purity would often vary with source of, and nature, of the specific mixture treated.

It is therefore the object of the present invention to provide an improved process obviating these difficulties and enabling more efficient recovery of meta-di-isopropylbenzene-di-hydroperoxide from mixtures comprising this compound in admixture with unconverted di-isopropylbenzene and di-isopropylbenzene-mono-hydroperoxide.

In accordance with the present invention meta-di-isopropylbenzene-di-hydroperoxide is separated from mixtures comprising meta-di-isopropylbenzene-di-hydroperoxide in admixture with di-isopropylbenzene and di-isopropylbenzene-mono-hydroperoxide, by adding hydrocarbon boiling below about 150° C. and maintaining the resulting mixture at a temperature at which precipitation of the desired meta-di-isopropylbenzene-di-hydroperoxide from solution occurs. In a modification of the invention, an additional solvent having polar characteristics, such as, for example, a saturated aliphatic ketone, is added to the hydrocarbon solvent employed, thereby forming two liquid phases; stratifying the resulting mixture; and recovering meta-di-isopropylbenzene-di-hydroperoxide from the lower liquid phase.

Hydrocarbons employed as solvent in accordance with the present invention comprise those having a boiling temperature below about 150° C. Particularly suitable solvents comprise the paraffins having from four to eight carbon atoms to the molecule and the alkylbenzenes. Suitable solvents comprise, for example, the pentanes, hexanes, heptanes, octanes, nonanes, etc., toluene, xylene, as well as mixtures thereof, and hydrocarbon fractions consisting essentially thereof. A suitable solvent comprises, for example, a gasoline fraction having a boiling range of from about 40° to about 60° C.

The relative amount in which the hydrocarbon solvent is preferably added to the meta-di-isopropylbenzene-di-hydroperoxide-containing mixture will vary within the scope of the invention in accordance with the nature and composition of the mixture treated and the temperature at which precipitation of the meta-di-isopropylbenzene-di-hydroperoxide will take place. The use of the solvent in amounts ranging, for example, from about one-half to about ten times the volume of the meta-di-isopropylbenzene-di-hydroperoxide-containing mixture being treated is satisfactory. Greater or lesser amounts of solvent may, however, be employed within the scope of the invention. In general, the solvent is preferably used in an amount ranging from about one-half to about five times, and still more preferably from about one to about three times, the volume of the mixture undergoing treatment.

Addition of hydrocarbon solvent to the mixture containing the meta-di-isopropylbenzene-di-hydroperoxide in admixture with di-isopropylbenzene and di-isopropylbenzene-mono-hydroperoxide results in precipitating a precipitate consisting essentially of meta-di-isopropylbenzene-di-hydroperoxide from solution. The optimum precipitation temperature will vary in accordance with composition of the mixture undergoing treatment, the specific solvent and quantity thereof employed, etc. In general precipitation is effected at temperatures which do not substantially exceed about 35° C. In a preferred method of executing the invention precipitation is effected at temperatures below about 25° C., for example, in the range of from about +25° to about −30° C., and still more preferably from about +10° to about −20° C. Separation of the precipitate from residual liquid comprising the unconverted di-isopropylbenzene, di-isopropylbenzene-mono-hydroperoxide and solvent may be effected by conventional means including, for example, one or more such steps as filtration, centrifuging, decantation, etc. The separation of the precipitated meta-di-isopropylbenzene-di-hydroperoxide from the mother liquor may be effected at a temperature in the above-defined precipitation temperature range or higher.

Precipitation of the desired meta-di-isopropylbenzene-di-hydroperoxide from the mixture being treated may be carried out in stages, during which mother liquor from a preceding stage is subjected to a repetition of the precipitation operation, optionally with addition of further amounts of the same or a different hydrocarbon solvent, at the same or a different temperature than employed in a preceding stage.

Separated meta-di-isopropylbenzene-di-hydroperoxide is preferably washed with a suitable wash liquid. Suitable wash liquids comprise the same hydrocarbon employed in the precipitation step or a different paraffinic hydrocarbon. The washed precipitate is then dried in conventional manner.

In a modification of the invention a polar solvent is added to the hydrocarbon solvent. Suitable polar solvents comprise, for example, the aliphatic ketones, such as, dimethyl ketone. The ketone may be added to the hydrocarbon solvent before its addition to the mixture to be resolved, or it may be added separately to the mixture obtained by adding the hydrocarbon solvent to the meta - di - isopropylbenzene-di-hydroperoxide - containing mixture being treated.

The relative amounts in which the polar solvent is employed may vary considerably within the scope of the invention. In general the polar solvent is employed in an amount ranging, for example, from about 0.1 to about 1.5 times the volume of the hydrocarbon solvent employed. Greater or lesser amounts of the polar solvent may, however, be employed within the scope of the invention. In a preferred method of carrying out the invention the polar solvent is added in an amount which does not substantially exceed the amount by volume of paraffin hydrocarbon solvent. Thus, the polar solvent, for example, dimethyl ketone, is employed in an amount ranging from about 0.25 to about 0.75 times the volume of hydrocarbon solvent being used.

Addition of both polar and hydrocarbon solvent to the meta-di-isopropylbenzene-di-hydroperoxide-containing mixture being treated will result in the formation of two separate liquid phases which separate upon standing. The lower of the resulting liquid layers will comprise meta-di-isopropylbenzene-di-hydroperoxide in admixture with polar solvent and hydrocarbon solvent. The upper layer will comprise di-isopropylbenzene-mono-hydroperoxide in admixture with unconverted di-isopropylbenzene and hydrocarbon solvent. The desired meta-di-isopropylbenzene-di-hydroperoxide is recovered from the lower layer by suitable means comprising one or more such steps as, for example, distillation, evaporation, decantation, filtration, centrifuging and the like. Thus meta-di-isopropylbenzene-di-hydroperoxide may be recovered from the lower liquid layer by flashing components lower boiling than meta-di-isopropylbenzene-di-hydroperoxide therefrom. In another suitable method, only part of the components lower boiling than the desired meta-di-isopropylbenzene-di-hydroperoxide are flashed off and the residue is cooled to a temperature at which the desired meta-di-isopropylbenzene-di-hydroperoxide will separate out as a precipitate. The precipitated meta-di-isopropylbenzene-di-hydroperoxide is then separated from residual liquid by one or more such steps as filtration, centrifuging, decantation or the like.

The lower liquid layer may be used as such, optionally after removal of only a part of the lower boiling components, in many instances where the use of crystalline meta-di-isopropylbenzene-di-hydroperoxide is normally called for.

EXAMPLE I

A mixture, identified by the designation "alpha," consisting essentially of meta-di-isopropylbenzene-di-hydroperoxide in admixture with di-isopropylbenzene and di-isopropylbenzene-mono - hydroperoxide, obtained by oxidizing meta-di-isopropylbenzene in the liquid phase with molecular oxygen, contained 15 weight percent of oxygen in the form of the mono- and di-hydroperoxide of meta-di-isopropylbenzene. Infrared spectroanalysis indicated the mono- and di-hydroperoxide compounds to be present in the mixture in a mole ratio of meta-di-isopropylbenzene-mono - hydroperoxide to meta-di-isopropylbenzene-di-hydroperoxide of 3:1. The mixture was divided into ten separate portions. To each portion there was added n-pentane at +20° C. in the amount indicated in the following Table A. Each of the mixtures was then cooled to either —20° C. or +20 C. as indicated in Table A and maintained at this low temperature for two hours. Crystallization took place in each case. The crystalline material was separated by filtration and washed with n-pentane at —5° C. The washed crystalline product was then dried in a desiccator under vacuum and thereafter subjected to analysis which indicated it to be meta-di-isopropylbenzene-di-hydroperoxide. Results obtained are set forth in the following Table A. The oxygen content of the crystalline product as actually determined is given in the following Table A in terms of percent of the oxygen content of an equivalent weight of pure meta-di-isopropylbenzene-di-hydroperoxide. The amount of oxygen present in the form of peroxide groups as determined for the crystalline product is given in the following Table A in terms of percent of the oxygen originally present in the charge to the recovery process as di-hydroperoxide.

Table A

|  | Pentane Added, Vol. Percent of Alpha | Oxygen Content of Crystalline Product | Amount of Oxygen Present in Form of Peroxide Group in Recovered Crystalline Product |
| --- | --- | --- | --- |
| Crystallization at —20° C | 50 | 89 | 87.5 |
|  | 75 | 89 | 82.5 |
|  | 100 | 88 | 85 |
|  | 150 | 94.5 | 92.5 |
|  | 200 | 94 | 100 |
|  | 250 | 100 | 100 |
|  | 300 | 90 | 100 |
| Crystallized at +2° C | 200 | 92 | 83.5 |
|  | 250 | 94 | 85 |
|  | 300 | 92 | 82.5 |

EXAMPLE II

To a meta-di-isopropylbenzene-di-hydroperoxide-containing mixture obtained by oxidizing meta-di-isopropylbenzene and having the same composition as the charge "alpha" used in the operation of the foregoing Example I, there was added 200 vol. percent of n-pentane and 25 vol. percent dimethyl ketone (vol. percent figures based on volume of "alpha" charge). The total mixture so obtained was then cooled to —20° C. The mixture separated into two liquid layers. The lower layer was separated and a solid crystalline product was crystallized therefrom by evaporating lower boiling components therefrom on a steam bath. Analysis of the crystalline product thus obtained indicated it to be meta-di-isopropylbenzene-di-hydroperoxide having an oxygen content equal to 90% by weight of theoretical.

EXAMPLE III 400 grams of water, 2 grams of sodium carbonate and 6 grams of talc were introduced in a stirred 1-liter flask filled with a reflux condenser. After a homogeneous suspension had been obtained by stirring, 200 grams of di-isopropylbenzene were added in which 1 gram of di-isopropylbenzene hydroperoxide had been dissolved. Stirring was continued until the di-isopropylbenzene was completely dispersed. Oxygen was then introduced at a rate of 15 liters per hour. The temperature was maintained at 85° C.

After 50 and 140 hours samples were drawn from the flask and centrifuged. 250% by volume of toluene was added to the oil phase separated from the samples, after which the temperature was reduced to —20° C. This temperature was maintained for 2 hours. Fairly coarse, readily filterable crystals were formed. These crystals were separated from the liquid by means of a glass filter, then washed with pentane of —5° C. and finally dried in a vacuum desiccator. The quantity of these crystals in the two samples was 10 and 55 mole percent, respectively, based on the starting di-isopropylbenzene.

In both cases the crystalline mass was substantially pure di-isopropylbenzene-di-hydroperoxide.

We claim as our invention:

1. The method of separating meta-di-isopropylbenzene-dihydroperoxide from a mixture comprising said meta-di-isopropylbenzene-di-hydroperoxide in admixture with di-isopropylbenzene and di-isopropylbenzene-mono-hydroperoxide which comprises adding to said mixture a hydrocarbon selected from the group consisting of aliphatic saturated hydrocarbons and alkylbenzenes having a boiling temperature below about 150° C. and crystallizing meta-di-isopropylbenzene-di-hydroperoxide from the resulting added hydrocarbon-containing mixture.

2. The process in accordance with claim 1 wherein said hydrocarbon solvent is a paraffinic hydrocarbon having from four to eight carbon atoms to the molecule and said crystallization of said meta-di-isopropylbenzene-di-hydroperoxide is effected at a temperature in the range of from about —20° to about +10° C.

3. The process in accordance with claim 1 wherein said hydrocarbon solvent is an alkylbenzene having a boiling temperature below about 150° C. and said crystallization of said meta-di-isopropylbenzene-di-hydroperoxide is effected at a temperature in the range of from about —20° to about +10° C.

4. The method of separating meta-di-isopropylbenzene-di-hydroperoxide from a mixture comprising said meta-di-isopropylbenzene-di-hydroperoxide in admixture with unconverted di-isopropylbenzene and di-isopropylbenzene-mono-hydroperoxide which comprises adding pentane to said mixture, cooling said resulting pentane-containing mixture to a temperature in the range of from about —20° to about +10° C., thereby crystallizing meta-di-isopropylbenzene-di-hydroperoxide from said pentane-containing mixture, and separating said crystallized meta-di-isopropylbenzene-di-hydroperoxide from said mixture.

5. The process for separating meta-di-isopropylbenzene-di-hydroperoxide from a mixture containing said meta-di-isopropylbenzene-di-hydroperoxide in admixture with di-isopropylbenzene and di-isopropylbenzene-mono-hydroperoxide which comprises adding a saturated aliphatic hydrocarbon boiling below 150° C. and an aliphatic ketone to said mixture, thereby forming a liquid phase comprising said di-isopropylbenzene-mono-hydroperoxide and a separate liquid phase comprising said meta-di-isopropylbenzene-di-hydroperoxide, and recovering meta-di-isopropylbenzene-di-hydroperoxide from said separate liquid phase by crystallization.

6. The method of separating meta-di-isopropylbenzene-di-hydroperoxide from a mixture comprising said meta-di-isopropylbenzene-di-hydroperoxide in admixture with unconverted di-isopropylbenzene and di-isopropylbenzene-mono-hydroperoxide which comprises, adding pentane and dimethyl ketone to said mixture, thereby forming a supernatant liquid phase comprising di-isopropylbenzene-mono-hydroperoxide and a separate lower liquid phase comprising meta-di-isopropylbenzene-di-hydroperoxide, separating said liquid phases, and crystallizing meta-di-isopropylbenzene-di-hydroperoxide from said separated lower liquid phase.

7. The method of separating meta-di-isopropylbenzene-di-hydroperoxide from a mixture comprising said meta-di-isopropylbenzene-di-hydroperoxide in admixture with unconverted di-isopropylbenzene and di-isopropylbenzene-mono-hydroperoxide which comprises, adding pentane and dimethyl ketone to said mixture, thereby forming a supernatant liquid phase comprising di-isopropylbenzene-mono-hydroperoxide and a separate lower liquid phase comprising meta-di-isopropylbenzene-di-hydroperoxide, separating said lower liquid phase from said supernatant liquid phase, cooling said separated lower liquid phase thereby crystallizing meta-di-isopropylbenzene-di-hydroperoxide from said separated lower liquid phase, and separating said crystallized meta-di-isopropylbenzene-di-hydroperoxide from said cooled, separated, lower liquid phase.

8. The process in accordance with claim 7 wherein said separated lower liquid phase is cooled to a temperature of from about —30° to about +35° C.

9. The process in accordance with claim 7 wherein said separated lower liquid phase is cooled to a temperature of from about —20° to about +10° C.

References Cited in the file of this patent

UNITED STATES PATENTS 2,715,646 Hawkins et al. _____ Aug. 16, 1955

FOREIGN PATENTS 641,250 Great Britain _____ Aug. 9, 1950